United States Patent
Hall et al.

(10) Patent No.: US 10,585,815 B2
(45) Date of Patent: Mar. 10, 2020

(54) WIRELESS DOCKING

(71) Applicants: Trevor Hall, Middlesex (GB); Martin Andrew Turnock, London (GB); Douglas Morse, Houghton (GB); Richard Jonathan Petrie, Guildford (GB); Daniel Ellis, Cambridge (GB); Rebecca Ann Edney, Cambridgeshire (GB)

(72) Inventors: Trevor Hall, Middlesex (GB); Martin Andrew Turnock, London (GB); Douglas Morse, Houghton (GB); Richard Jonathan Petrie, Guildford (GB); Daniel Ellis, Cambridge (GB); Rebecca Ann Edney, Cambridgeshire (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 37 days.

(21) Appl. No.: 16/060,923

(22) PCT Filed: Dec. 6, 2016

(86) PCT No.: PCT/GB2016/053840
§ 371 (c)(1),
(2) Date: Jun. 8, 2018

(87) PCT Pub. No.: WO2017/098231
PCT Pub. Date: Jun. 15, 2017

(65) Prior Publication Data
US 2019/0340137 A1    Nov. 7, 2019

(30) Foreign Application Priority Data
Dec. 11, 2015 (GB) .................................. 1521914.0

(51) Int. Cl.
*G06F 1/16* (2006.01)
*H04W 12/06* (2009.01)
(Continued)

(52) U.S. Cl.
CPC .......... *G06F 13/102* (2013.01); *G06F 1/1632* (2013.01); *H04L 63/10* (2013.01);
(Continued)

(58) Field of Classification Search
None
See application file for complete search history.

(56) References Cited

U.S. PATENT DOCUMENTS 9,088,305 B2 * 7/2015 Jurgovan .................. G06F 1/26
9,204,301 B2 * 12/2015 Huang .................. G06F 1/1632
(Continued)

FOREIGN PATENT DOCUMENTS

WO    WO 2014/189660    11/2014

*Primary Examiner* — Steven G Snyder
(74) *Attorney, Agent, or Firm* — Haynes and Boone, LLP (57) ABSTRACT

A method of controlling a wireless docking station, which has one or more peripheral devices connected thereto, which are controllable from a mobile device when the mobile device is docked with the wireless docking station. The method involves receiving (S41) a sensing signal indicating that a user is proximate the peripheral device(s) and detecting (S42) that a mobile device is within a predetermined range of the wireless docking station. An identification of the mobile device is determined and the user is requested (S43) to confirm that the user wants to dock the mobile device having the identification with the wireless docking station. When a confirmation signal (S44) is received, an authentication of the mobile device having the identification is permitted to be performed whereby the mobile device having the identification is docked (S47) with the wireless docking station if the authentication is successful.

20 Claims, 9 Drawing Sheets

(51) Int. Cl.
*G06F 13/00* (2006.01)
*G06F 13/10* (2006.01)
*H04W 48/16* (2009.01)
*H04L 29/06* (2006.01)

(52) U.S. Cl.
CPC ........... *H04W 12/06* (2013.01); *H04W 48/16* (2013.01); *G06F 2213/40* (2013.01)

(56) References Cited

U.S. PATENT DOCUMENTS

| | | | |
|---|---|---|---|
| 9,225,376 B2 * | 12/2015 | Olson | H04B 1/3877 |
| 9,319,109 B2 * | 4/2016 | Jurgovan | G06F 1/26 |
| 9,436,220 B2 * | 9/2016 | Rosenberg | G06F 1/1632 |
| 9,442,526 B2 * | 9/2016 | Rosenberg | G06F 1/1632 |
| 9,571,148 B2 * | 2/2017 | Olson | H04B 1/3877 |
| 9,578,442 B2 * | 2/2017 | Dees | H04W 4/70 |
| 9,772,654 B2 * | 9/2017 | Brabenac | H04W 4/80 |
| 9,820,320 B2 * | 11/2017 | Cohn | H04M 1/72527 |
| 9,853,970 B2 * | 12/2017 | Glik | H04L 63/0861 |
| 9,946,300 B2 * | 4/2018 | Rosenberg | G06F 1/1632 |
| 10,122,184 B2 * | 11/2018 | Smadi | H02J 7/00 |
| 2011/0162035 A1 * | 6/2011 | King | G06F 1/1632 726/1 |
| 2012/0233549 A1 * | 9/2012 | Ricci | H04M 1/72519 715/740 |
| 2013/0297844 A1 * | 11/2013 | Rosenberg | G06F 1/1632 710/303 |
| 2014/0059263 A1 | 2/2014 | Rosenberg et al. | |
| 2014/0274200 A1 * | 9/2014 | Olson | H04B 1/3877 455/552.1 |
| 2015/0011160 A1 * | 1/2015 | Jurgovan | G06F 1/26 455/41.1 |
| 2015/0094024 A1 | 4/2015 | Abiri et al. | |
| 2015/0257183 A1 * | 9/2015 | Pentelka | H04M 1/7253 455/41.2 |
| 2015/0318898 A1 * | 11/2015 | Jurgovan | G06F 1/26 455/41.1 |
| 2015/0358314 A1 | 12/2015 | Glik et al. | |
| 2016/0080021 A1 * | 3/2016 | Olson | H04B 1/3877 455/552.1 |
| 2016/0254954 A1 * | 9/2016 | King | G06F 1/1632 726/1 |
| 2016/0282904 A1 * | 9/2016 | Brabenac | H04W 4/80 |
| 2016/0349795 A1 * | 12/2016 | Rosenberg | G06F 1/1632 |
| 2017/0054734 A1 * | 2/2017 | Sigal | H04L 63/105 |
| 2017/0171894 A1 * | 6/2017 | Cohn | H04W 4/023 |
| 2018/0074547 A1 * | 3/2018 | Smadi | H02J 7/00 |

* cited by examiner

WIRELESS DOCKING

CROSS-REFERENCE TO RELATED APPLICATIONS

This application is a U.S. national stage application under 35 U.S.C. § 371 of International Patent Application No. PCT/GB2016/053840, filed on Dec. 6, 2016, which claims the benefit of Great Britain Patent Application No. 1521914.0, filed on Dec. 11, 2015, the contents of each of which are incorporated herein by reference in their entirety.

BACKGROUND

As mobile computing devices ("Mobiles") such as laptops, tablet computers, and even smartphones and smart watches become more powerful and more portable, it is becoming common for users to use such devices in place of conventional desktop computers. However, because a Mobile is usually physically small and likely to have limited access to convenient input and output methods, it is convenient for the user to connect it to a desktop docking station. Docking stations are devices to which one or more desktop peripheral devices are connected, such as a large display (which could be touch sensitive), input devices, such as a mouse and/or a keyboard, and, perhaps a printer and wired network access. This will allow access to external display devices to replace or supplement any internal display, as well as input methods such as a mouse and keyboard.

Conventionally, connections between a docking station and a Mobile are initiated through user interaction with the Mobile, for example by plugging in a cable or initiating a command to connect with a specific network or docking station. This is inconvenient, especially where the user wishes to connect wirelessly, and therefore it might be more appropriate for the Mobile to connect automatically. However, configuring a Mobile to automatically connect wirelessly causes further problems.

A secure connection between the user's device and docking station should only be established intentionally, for example when that user is at his or her desk using the docking station. In this case, the connection should not be activated when the user is not at his or her desk since this is not secure even if the user's Mobile is in wireless range of the docking station. However, this can occur with conventional systems if they are configured for the Mobile to connect automatically. Furthermore, it would be beneficial for the connection to exclude other users from connecting to a docking station they are not authorised to use: a limitation which is also impossible with conventional systems.

The invention seeks to solve or at least mitigate all or some of these problems.

SUMMARY OF THE INVENTION

Therefore, in accordance with a first aspect, the invention provides a method of controlling a wireless docking station, the wireless docking station having one or more peripheral devices connected thereto, the one or more peripheral devices being controllable from a mobile device when the mobile device is docked with the wireless docking station, the method comprising:

receiving a sensing signal indicating that a user is proximate the one or more peripheral devices;

in response to receiving the sensing signal indicating that a user is proximate the one or more peripheral devices, searching for a mobile device within a predetermined range of the wireless docking station;

detecting a mobile device within a predetermined range of the wireless docking station;

determining an identification of the detected mobile device;

requesting confirmation from the user that the user wants to dock the mobile device having the determined identification with the wireless docking station;

receiving a confirmation signal in response to the requested confirmation indicating that the user wants to dock the mobile device having the identification with the wireless docking station; and in response to receiving the confirmation signal, permitting an authentication of the mobile device having the identification to be performed whereby the mobile device having the identification is docked with the wireless docking station if the authentication is successful.

According to an embodiment, the method further comprises, in response to receiving the confirmation signal, obtaining an authorisation signal indicating that the user is authorised to dock the mobile device having the identification with the wireless docking station. Preferably, the authorisation signal indicates that the user is authorised to use the wireless docking station. The authorisation signal may indicate that the user is authorised to use the mobile device having the identification. Preferably, obtaining the authorisation signal comprises sending an authorisation request signal to a particular peripheral device to notify the user that the authorisation signal is being requested.

The method may further comprise utilising the predetermined peripheral device to notify the user that an answer to a predetermined question is required in order to provide the authorisation signal. The answer is sent to the mobile device having the identification to allow the mobile device having the identification to determine whether the answer is correct and to provide the authorisation signal if the answer is correct.

In one embodiment, the authorisation signal is produced following the user input via at least one of:

a mouse used to enter a sequence of data inputs, a keyboard used to enter a sequence of key actuations;

a touch sensitive display panel used to enter a sequence of data inputs;

a desktop phone used to enter a sequence of key pushes;

a biometric scanner used to enter one or more of a retinal scan, a facial recognition signal, a fingerprint scan, a handprint scan, and a voice recognition signal.

The sensing signal may be received from at least one of:

a proximity sensor indicating that the user is within a predetermined distance;

a seat sensor indicating the user has sat down on a seat proximate the one or more peripheral devices;

a camera indicating the presence of the user;

a mouse indicating a movement of the mouse or a press of a mouse button of the mouse;

a touch sensitive display panel indicating a press of a button on the touch sensitive display panel;

a desktop phone indicating a press of a button on the desktop phone or indicating the presence of a user by a camera on the desktop phone; and a keyboard indicating a press of a key on the keyboard.

In a preferred embodiment, requesting confirmation from the user comprises:

sending a confirmation request signal to a particular peripheral device, the confirmation request signal including the identification of the mobile device; and utilising the particular peripheral device to notify the user that a confirmation indicating that the user wants to dock the mobile device having the identification is required.

The confirmation request signal may include a plurality of the identifications of a plurality of the mobile devices detected within the predetermined range of the wireless docking station, and the particular peripheral device is used to request the user to confirm which of the plurality of mobile devices the user wants to dock with the wireless docking station The particular peripheral device may comprise at least one of:
  a display screen;
  a touchscreen display panel;
  a desktop phone having at least a speaker and, optionally, a display; and
  a speaker.

The confirmation signal may be produced by a user actuating at least one of:
  a mouse;
  a push button on a housing of the wireless docking station;
  a particular button on a keyboard;
  a particular button on a touch sensitive display panel;
  a particular button on a desktop phone; and The one or more peripheral devices may comprise at least one of:
  a mouse;
  a keyboard;
  a display screen;
  a touchscreen display panel;
  a camera;
  a speaker;
  a microphone;
  a biometric scanner; and
  a desktop telephone.

According to a second aspect, the invention provides a wireless docking station controller for controlling a wireless docking station, the wireless docking station having one or more peripheral devices connected thereto, the one or more peripheral devices being controllable from a mobile device when the mobile device is docked with the wireless docking station, the wireless docking station controller configured to perform a method as described above.

According to a third aspect, the invention provides a system comprising a wireless docking station controller as described above, a wireless docking station connected to the wireless docking station controller and one or more peripheral devices connected to the wireless docking station, the one or more peripheral devices comprising at least one of:
  a mouse;
  a keyboard;
  a display screen;
  a touchscreen display panel;
  a camera;
  a speaker;
  a microphone;
  a biometric scanner; and
  a desktop telephone.

Preferably, the system is configured to perform a method as described above.

The wireless docking station controller can either be a separate module connected to a conventional docking station or it can be incorporated into a docking station.

In an example, the basic method may therefore comprise:
  1. A Connection Trigger being supplied to the wireless docking station controller;
  2. The wireless docking station controller searching for an appropriate Mobile;
  3. The wireless docking station controller attempting to connect to the Mobile;
  4. The wireless docking station controller receiving connection data;
  5. The wireless docking station controller handling the connection process; and
  6. The Mobile being connected to the wireless docking station.

The Connection Trigger may be an interaction with the wireless docking station or wireless docking station controller that produces a signal indicating to the wireless docking station controller that it should initiate a docking connection. It may take the form of user input or an automatic signal from another device. For example, it may be interaction by the user with a peripheral connected to the wireless docking station and capable of communicating with the wireless docking station controller, or a network signal, or for backwards compatibility it may be a signal from an appropriately-arranged Mobile, such as a Mobile running a specially-designed and configured connection application.

Connection data is data that is required in order for a connection to be initiated. This may include details such as an IP address, radio frequency and channel, certification, or mac address or similar identification. It is likely to include any information that identifies the Mobile and any required association data.

The Mobile and the wireless docking station controller should be configured to be capable of connecting to one another prior to connection in order to allow a secure connection. This is known as Association and may be carried out either through a first connection in which appropriate data is entered on the Mobile and the wireless docking station to allow the two devices to identify one another, or by configuring the Mobile only, for example by installing an appropriate application. It may also be possible to configure the wireless docking station controller only, for example by configuring it to connect to any Mobile automatically, but the Mobile in question must also be appropriately configured even if only to allow it to connect automatically to any wireless docking station controller. Association data may be present where the Mobile and the wireless docking station have previously been connected, in which case Association is not required.

The wireless docking station controller and the above-described method of using it are beneficial because they will allow the user to initiate docking by interaction with a user interface device connected to a wireless docking station rather than requiring interaction with the Mobile.

Confirmation may be incorporated into the connection process above directly after the identification of the Connection Trigger. The input used for the Connection Trigger and the input used to create the Confirmation Signal may be the same, such that a single event leads to both signals: for example, a keystroke on a keyboard connected to the wireless docking station acts as a Connection Trigger, and the user typing a specific command acts as Confirmation. In this case, typing in the command leads to both signals being sent. However, they may be different and require different inputs: for example, a signal from a webcam acts as a Connection Trigger, but the connection may only continue upon receiving a vocal command, which produces a Confirmation Signal.

Confirmation may be immediate, as would especially be the case where it is part of the identification of the Connection Trigger, but there may also be some period of time during which it can occur before the connection attempt ends. For example, the wireless docking station controller may receive a network signal, which acts as a Connection Trigger. It may then activate a connected webcam and wait for a period of time, e.g. five minutes, for a user to sit down at the desk, facing the webcam. The recognition of this image by the wireless docking station controller can act as the Confirmation.

Example inputs that may trigger Confirmation Signals may include:
- Using a webcam to confirm that there is a user near the docking station, possibly in a specific place such as sitting at his or her desk facing the camera.
- Using a microphone to listen for a command to connect, for example a spoken command or an audio signal generated by a device
- Accepting input from a desktop device in the same way as a computer might be woken from sleep, for example a key press or a mouse movement.
- Placing a Mobile in a specific location relative to the docking station, for example on a charging pad.

Confirmation may also include an indication of which of several Mobiles should be connected to by the wireless docking station. This is most likely to be achieved through the provision of a user interface offering the user a choice of Mobiles to which the wireless docking station controller may attempt to connect. This list may be compiled as a list of Mobiles to which the wireless docking station controller has previously connected, or it may be compiled by polling for all Mobiles in range and listing them. In any case, the act of choosing a Mobile can act as confirmation that the user does intend to connect to that Mobile and as such generate a Confirmation Signal.

The inclusion of Confirmation is beneficial because it reduces the chance of an accidental connection; the wireless docking station controller will only proceed with connection if it is confirmed that the user does intend to connect and the provision of the Connection Trigger was not an accident. This addresses the problem with wireless connections mentioned above: wireless signals are not constrained by walls and a user need not be in the same room or even the same building to make a connection without a control mechanism which a requirement for a Confirmation Signal provides.

There may also be methods for applying security controls. The most notable of these are Dock Security and Device Security. Of these two, Dock Security refers to a layer of security connected to the docking station which confirms that the user is permitted to use the docking station. Device Security is specific to the Mobile to which the wireless docking station controller is attempting to connect and verifies that the user is permitted to use that specific Mobile. Each is analogous to logging on to the appropriate device.

Both aspects of security are handled by and carried out through the wireless docking station, as this is the initiator of the connection. The two aspects of security are independent of one another and one may occur without the other. Furthermore, they are herein described in an order whereby Dock Security precedes Device Security, but this order may be reversed.

Security methods may be activated by Confirmation as previously defined and may involve the same input as triggered the Confirmation Signal. For example, Confirmation comprises checking an image taken by a webcam to see if there is a user near the wireless docking station, and a security method is to compare the image taken of the user to a database of permitted users.

The two aspects of security may also use the same input data as one another. For example, if a user has a Mobile issued by his or her employer, the Mobile and the user's allocated wireless docking station may require the same password to allow access. In this case, the user may input the password and have it approved at the Dock Security stage, and then the same password is transmitted to the Mobile for approval at the Device Security stage. Alternatively, the two aspects may use different data, such that, for example, the appropriate input for Dock Security is a fingerprint scan and the correct input for Device Security is an audio input such as a voice print.

Advantageously, there may be provided a backup layer to either of the aspects of security so that if the user does not pass the main security requirements—for example, he or she mis-types a password or the photograph taken for image recognition is from a slightly different angle to the stored image used for comparison and so does not match—the connection need not automatically fail. This may be in the form of multiple attempts at the same method of security input, such as three attempts at entering a password, or it may be a different method, such as using a fingerprint scanner if a voice print does not match.

In summary, in some embodiments there may be up to four separate interactions with the wireless docking station:
- Connection Trigger
- Confirmation
- Dock Security
- Device Security Any or all of them may use the same interaction and/or input data as the others.

The inclusion of Dock Security is beneficial because it adds an extra level of security to any that may already be in place, especially with regard to any other devices that may be connected to the wireless docking station. It ensures that an unauthorised user is unable to trigger the wireless docking station to connect to any Mobile, even if the Mobile is able to connect to the wireless docking station and/or the user is permitted to use the Mobile.

The inclusion of Device Security is beneficial because it ensures that the user is not able to—accidentally or deliberately—trigger a connection to a Mobile that he or she is not permitted to use. This might especially happen where the wireless docking station simply connects to the first Mobile, or the closest Mobile, or the Mobile with the strongest signal.

At all stages, the wireless docking station controller may access either all input peripheral devices, only those requested by the Mobile (where the input expected is Device Security input), or a subset of the peripheral devices, perhaps according to type or security classifications or pre-coded instructions.

The full process may, in some embodiments, therefore comprise:
1. A Connection Trigger being supplied to the wireless docking station controller;
2. A Confirmation Signal being sent;
3. Optionally, Dock Security data being input;
4. The wireless docking station controller searching for an appropriate Mobile;
5. The wireless docking station controller attempting to connect to a Mobile;
6. Optionally, Device Security data being input;
7. The wireless docking station controller receiving connection data;
8. The wireless docking station controller handling the connection process; and 9. The Mobile being connected to the wireless docking station.

In addition, there could be various heuristics and/or interfaces provided for automatically selecting which of a number of Mobiles in range should be connected to.

A first example heuristic is a method by which the wireless docking station controller attempts to connect to the Mobile with the strongest wireless signal.

Alternatively, as a second example heuristic, the wireless docking station controller may be aware of the physical location of the wireless docking station and the Mobiles may be likewise aware of their locations and broadcast these, allowing the wireless docking station controller to first attempt to connect to the device physically closest to it. Each Mobile could also be located by triangulation with other wireless docking stations, in an environment where there are multiple wireless docking stations nearby. This would mean that the Mobile does not need to be aware of its absolute location and its location may only be calculated when it is contacted by the wireless docking station controller. This would also have the benefit that only Mobiles located within a particular area could be located reliably and therefore Mobiles outside would be unlikely to appear in a list of possible connections.

As a variation on location-based heuristics, the wireless docking station controller could make use of an internal accelerometer on a Mobile to indicate recent movement. Under these circumstances, the wireless docking station controller could preferentially attempt to connect to a Mobile which has recently been moving towards the wireless docking station.

Another location-based method would involve a specific location, such as a position on a desk where there might, for example, be a wireless charging pad. The wireless docking station controller may then preferentially connect to a Mobile in that location regardless of other factors. In the case where the location is a wireless charging pad, the wireless docking station controller could also or instead preferentially connect to the Mobile being charged by the or a wireless charging pad.

Another selection method comprises receiving user input identifying a Mobile to which the wireless docking station controller should attempt to connect. Such input may produce a Confirmation Signal as previously mentioned, or it may be entirely separate from both the Connection Trigger and the Confirmation Signal. In the first case, the act of selecting a Mobile to which the wireless docking station controller should connect is confirmation that the user does intend to connect a Mobile to the wireless docking station. In the second case, the user has already confirmed that he or she wishes to connect to a Mobile through some other means, and the selection of the Mobile merely indicates which one.

The wireless docking station controller may solicit this input by scanning for Mobiles in range and providing a user interface listing the Mobiles to which the wireless docking station controller can attempt to connect. The wireless docking station controller then receives user input indicating a Mobile and attempts to connect to this Mobile. At this stage it may also receive necessary Device Security data. Alternatively, the trigger or confirmation data may include input identifying a Mobile to which the wireless docking station controller should attempt to connect, for example the user typing in a user-friendly name such as "MyPhone" or "Jane's Tablet", causing the docking station to search for a specific Mobile.

One of these heuristics could be combined with the use of Device Security if this were input before connection is attempted such that the wireless docking station controller attempts to connect to each Mobile with the security input it has.

If there is no Device Security, it is likely that the first connection will be successful. If not, or if there is Device Security and the wireless docking station controller is unable to provide the correct security input, this would be a failure case. In a failure case, the wireless docking station controller could attempt to connect to the next Mobile in a sequence and so on until it either connects or there are no more Mobiles available.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
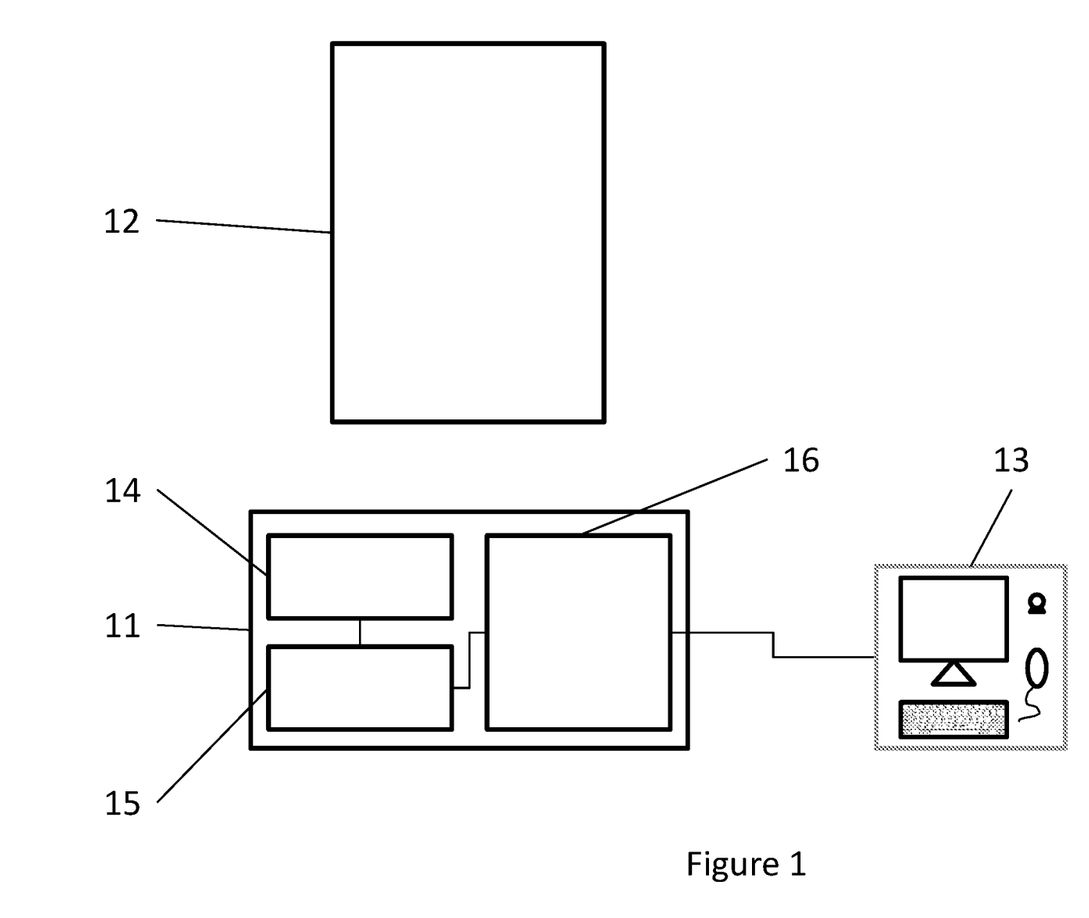
FIG. 1 is a diagram of a system with an unconnected Mobile.

FIG. 1 shows a wireless docking station [11] which includes, among other components, a docking controller [14], a connection processor [15], and a hub [16]. The hub [16] is likely to have an upstream port for connecting to a host, which may be a Mobile [12], and one or more downstream ports for connecting to peripheral devices such that the Mobile [12] is able to control the peripheral devices via the docking station [11]. Peripheral devices [13] are shown in FIG. 1 and include a display device, keyboard, mouse, and webcam. For clarity, these are shown as a unit connected to the hub [16] via a single line, though in practice it is likely that all the peripheral devices [13] will be connected to individual downstream ports. The hub [16] is in turn connected to the connection processor [15], which carries out any required processing of data passing through the docking station [11], as well as controlling devices connected to the hub [16].

In this embodiment, the docking controller [14] is a separate component of the docking station [11], but it could be incorporated into the connection processor [15], for example by being embodied as software or firmware. Alternatively, the docking controller [14] could provide backwards compatibility by being connected to or incorporated into a conventional docking station [11] and operate by passing connection data to the connection processor [15] as hereinafter described.

As mentioned, FIG. 1 also shows a Mobile [12] which is as yet unconnected to the docking station [11]. The Mobile [12] may have previously been Associated with the docking station [11] and thus be carrying credentials of some kind indicating that it should preferably be connected to or allowing the user to bypass any Dock Security, for example. In any case, Association of some sort is necessary in order to allow a secure connection. This may take place on first connection or through, for example, the installation of an application on the Mobile [12] which allows it to receive connection attempts by docking stations [11].

Figure 2:
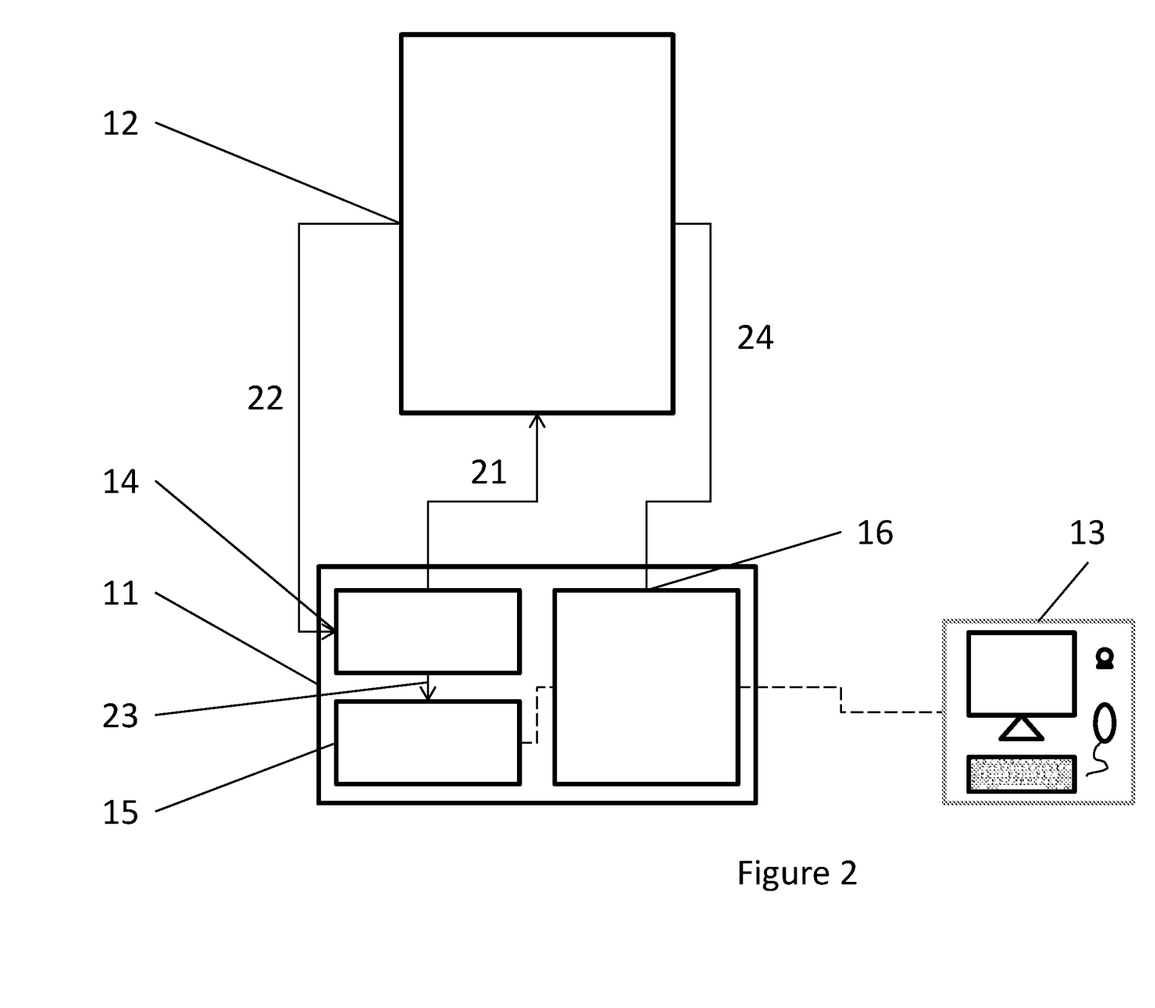
FIG. 2 is a diagram showing signals exchanged by a docking controller and the Mobile.

FIG. 2 shows the same docking station [11], Mobile [12], and peripheral devices [13], as in FIG. 1. In this case, however the connections within the docking station [11] and between the docking station [11] and the peripheral devices [13] are now shown as dotted lines and the signal paths between the Mobile [12] and the docking station [11] are shown as solid arrows [21, 22, 23]. The eventual full connection [24] between the Mobile [12] and the upstream port of the hub [16] is shown as a solid line. Before this connection [24] is in place there will be an initial connection suitable for the signals [21, 22] that pass between the docking station [11] and the Mobile [12] but this connection will not have full functionality and is not individually shown here. It will, however, be a single connection and the two signals [21, 22] are only shown separately for clarity.

Figure 3:
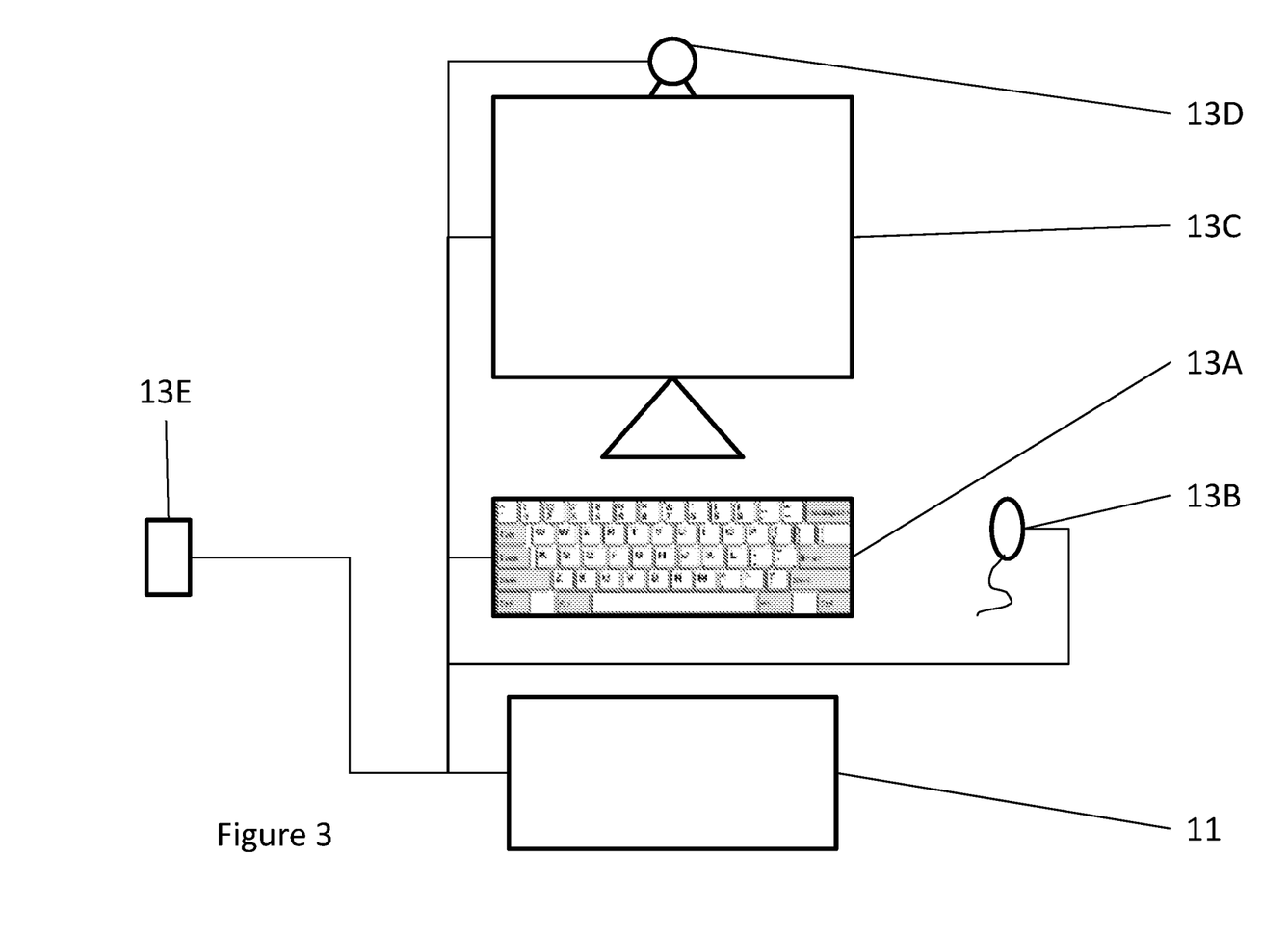
FIG. 3 is a diagram showing a number of desktop peripheral devices and a biometric peripheral device connected to a docking station.

FIG. 3 shows the docking station [11] of FIGS. 1 and 2, although in this diagram the internal components are not shown. The docking station [11] is connected to a keyboard [13A], mouse [13B], display device [13C] and webcam [13D], as well as a fingerprint reader [13E]. In this embodiment the webcam [13D], keyboard [13A] and mouse [13B] are classified as desktop input devices and the fingerprint reader [13E] as a biometric input device. The docking controller [14] (that is internal to the docking station [11]) is aware of the peripherals [13] connected to the docking station [11] and is able to listen for signals from specific devices or groups of devices.

Figure 4:
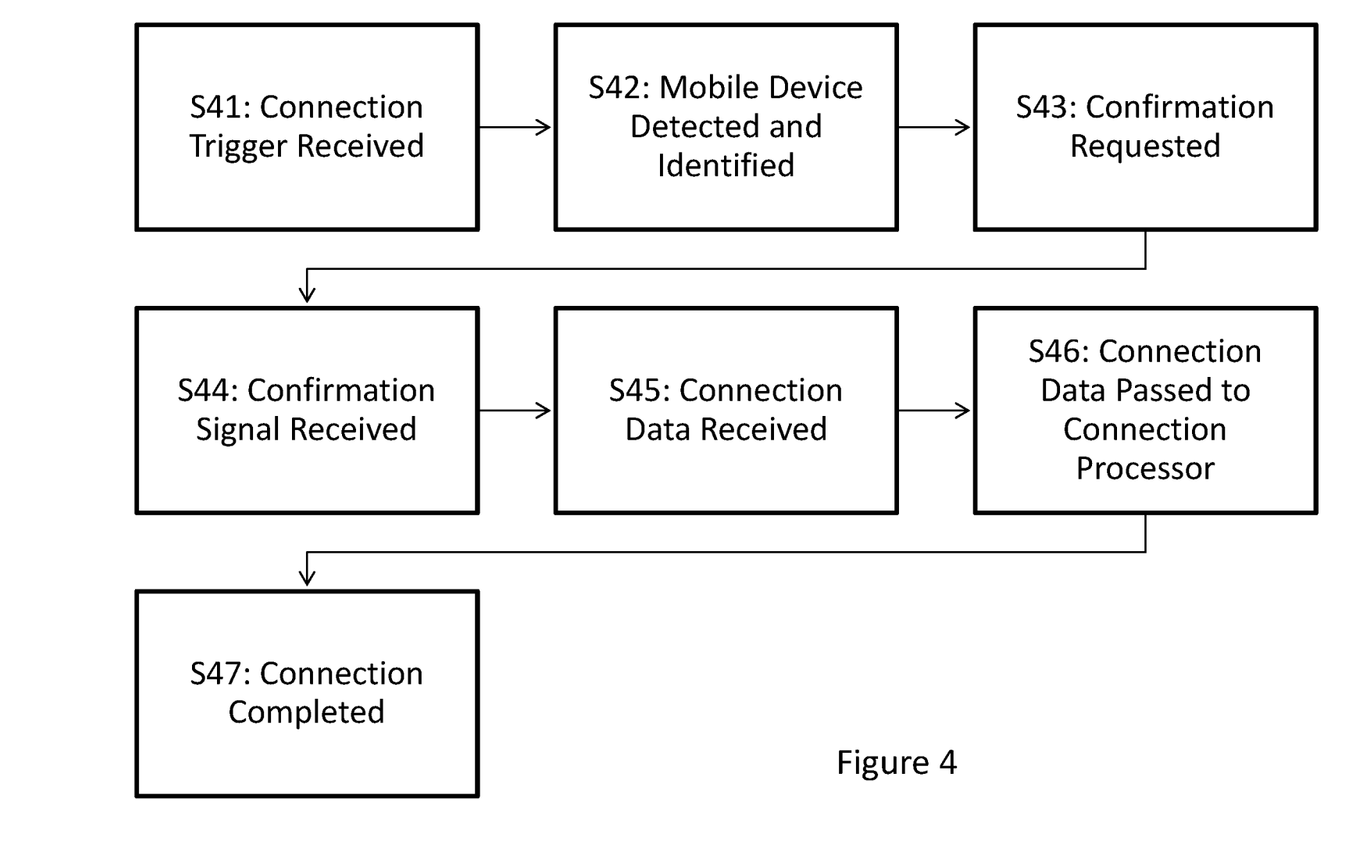
FIG. 4 shows a flow diagram of a process of connection.

FIG. 4 shows the process of the docking station [11] connecting to the Mobile [12] in the system shown in FIGS. 1, 2, and 3. At Step S41, the docking controller [14] receives a sensor signal, which may be considered as a Connection Trigger, indicating that the user is near at least one of the peripherals [13]. This sensor signal may be triggered by input received from a peripheral [13], such as movement detection through the webcam [13D], a keystroke on the keyboard [13A], or movement of or clicking a button on the mouse [13B]. Any of these will indicate to the docking controller [14] that the user is close to the peripheral with which he or she interacted and that he or she may wish to connect to the docking station [11]. Of course, other interactions may be possible through other peripherals not shown here, such as a touch sensitive display panel, or touchscreen, in the display device [13C] which can detect a touch by the user in order to supply a Connection Trigger, or a desktop phone which has a keypad and microphone that can detect interactions. Such additional peripherals may also include dedicated peripherals such as a push button on or connected to the docking station [11], or a proximity sensor which detects movement or presence within a certain distance or at a certain location. An example of such a sensor is a pressure sensor in a chair associated with a desk which detects when a user has sat down and sends a signal to the docking station [11].

In this example, the user moves the mouse [13B] which senses the movement and therefore signals the docking station [11] to indicate that the user has interacted with it. The docking station [11] receives this signal, which is passed to the docking controller [14] as a Connection Trigger.

At Step S42, the docking controller [14] searches for and identifies an appropriately-configured Mobile [12]. It may poll for any Mobiles within range either until it detects one or for a pre-set time period, after which it times out and the process ends. If it detects more than one Mobile it may apply heuristics to select one as described below, but for the purposes of this example it finds exactly one. It then queries the Mobile [12] for an identification, such as a unique identifying serial number, and then requests and waits for a Confirmation Signal, which is a signal confirming that the user did intend to initiate a connection to the Mobile. It requests this signal at Step S43.

This will involve activating input peripheral devices [13] that will allow the user to interact with the docking station [11], such as, in the system shown in FIGS. 1, 2, and 3, the mouse [13B], the keyboard [13A], the webcam [13D], and the fingerprint scanner [13E]. If the display device [13C] has a touchscreen, the touchscreen element may also be activated to allow the user to input a Confirmation Signal through touching the screen. There may also be other peripheral devices, such as an individual push button on or connected to the docking station [11], a desktop phone with keypad and microphone, and/or a standalone microphone. There may also be other input peripheral devices apart from those listed here in different contexts. The input peripheral device used for the Confirmation Signal may be the same as the peripheral device through which the Connection Trigger was received.

Depending on the exact embodiment, the inputs used may be different subsets of the inputs available. In one example, the input used is always the input used for the Connection Trigger, such that in this example the user might, for example, input a particular sequence of mouse clicks or click in a particular location such as on an automatically-generated soft button visible on the display device [13C], but in another example where the Connection Trigger was given through the keyboard [13A] the user must type in a command. The wireless docking station controller might require the Confirmation Signal through a specific input, but preferably this should be flexible depending on the peripheral devices attached and being used by the user. This is the most beneficial arrangement, as the docking station [11] will usually be aware of what peripheral devices [13] are connected.

In another embodiment, the wireless docking station controller might listen for Confirmation Signals from all the input peripheral devices [13A, 13B, 13D, 13E] attached. There might be a specific Confirmation Signal associated with each peripheral device [13A, 13B, 13D, 13E] or the wireless docking station controller might simply listen for any signal that seems deliberate according to pre-configured criteria.

In an elaboration of such an embodiment, the wireless docking station controller [14] may be aware of the classification of the input peripheral device through which it received the Connection Trigger and only listen for Confirmation Signals from other peripheral devices of the same classification. In this example, it might therefore receive a Connection Trigger from the mouse [13B] and listen for Confirmation Signals from the webcam [13D], keyboard [13A] and mouse [13B], as these may be similarly classified as desktop input peripheral devices.

In some cases, such as the fingerprint reader [13E], the type of input that would be deliberate is obvious. In others, the request for a Confirmation Signal may trigger a visible, tactile, or audible message to the user, instructing him or her how to input a Confirmation Signal. For example the display device [13C] may display a message "Please hit Enter to connect to Jane's Tablet" where 'Jane's Tablet' is the user-friendly name of the detected and identified Mobile, and the Confirmation Signal is sent when the user actuates the 'Enter' key. If the display device [13C] is a touchscreen, an analogous soft button may be shown directly on the display device [13C]. Finally, such a request may be output audibly over connected speakers or even through a desk phone.

Figure 5:
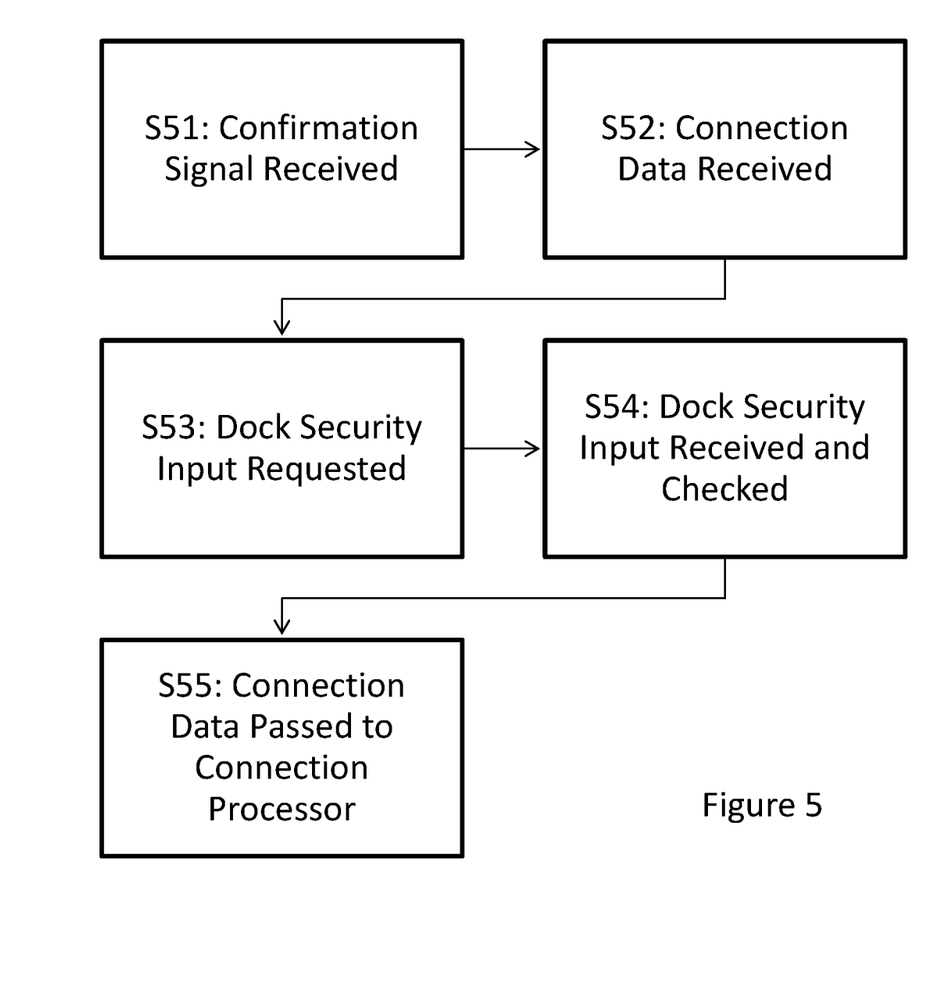
FIG. 5 is shows a flow diagram of a process of connection including dock security.

In any case, at Step S44 the wireless docking station controller [14] receives an appropriate Confirmation Signal. This indicates to it that the user does intend to connect and it will request and receive connection data from the Mobile [12] at Step S45. With this information, it is possible for the Mobile [12] to be connected to the docking station [11] and the docking controller [14] passes the connection data received to the connection processor [15] at Step S46 with the signal labelled [23]. At Step S47, the connection processor [15] then completes the process and forms a connection [24] just as if it had received a connection request from the Mobile [12] in the conventional way, and the Mobile [12] and the peripherals [13] are then able to exchange data and signals as normal. The connection processor [15] is not aware of how the connection information required was obtained and the user does not need to interact with the Mobile [12] in order to achieve this result as the connection is mediated entirely by the docking station [11]. FIG. 5 shows the process followed where Dock Security is used. At Step S51, a Confirmation Signal is received as previously described at Step S44. Connection Data as previously mentioned is then received and the docking station [11] then requests security input at Step S53. This may be done by the wireless docking station controller [14] or the connection processor [15], depending on the exact embodiment. In either case, the external result will be the same.

As is the case for Confirmation Signals, Dock Security data may be input in a number of ways, which may be selected and activated according to different heuristics including those described above, as appropriate. It is likely, however, that the wireless docking station [11] will be programed with a specific expected security input from a specific input peripheral device [13A, 13B, 13D, 13E] and it may display a request for such input on the display device [44]. For example, the display device [13C] may display a message requesting a password, which is then entered using the keyboard [13A], though other prompt and input methods could be used. For example, an audio request may be played through a connected speaker and the user could respond aloud through a microphone. Obviously, other security inputs could also be used depending on the circumstances and the peripherals connected. These may include:

Entering a series of mouse inputs, such as a particular click sequence or clicking on the correct one of a number of choices displayed on the display device [13C], for example a pre-selected security image displayed among many images.

Using a touchscreen to select the correct one of a number of choices displayed on the touchscreen, as above, or to enter a predetermined series of gestures by tapping and dragging a finger on the screen.

Using a desktop phone to enter a PIN using the keypad

A biometric device, for example the fingerprint scanner [13E] but any biometric device could be used, which receives a unique physical identifier of the user such as, in this example, a fingerprint scan.

This input is received at Step S54 and compared with the input expected by the docking station [11]. If it matches, the process continues to Step S55, which is the same as Step S46 as shown in FIG. 3. The comparison is performed by the docking station [11], so there is no interaction with the Mobile [11] required, although there may be network interaction as hereinafter described. The specific function of the Dock Security may be to ascertain that the user is permitted to use the wireless docking station [12] at all, or may be to ascertain that the user is permitted to dock the Mobile [11] with the docking station [12], in which case the input may also be used for Device Security as described below.

If the input does not match, either the docking station [11] could reject the input immediately and end the process so that the user must re-initiate the docking attempt by repeating the Connection Trigger, or there could be a second security step, using a different input and perhaps even a different input method. Further attempts could be repeated any appropriate number of times before the connection attempt fails and the process ends.

Figure 6:
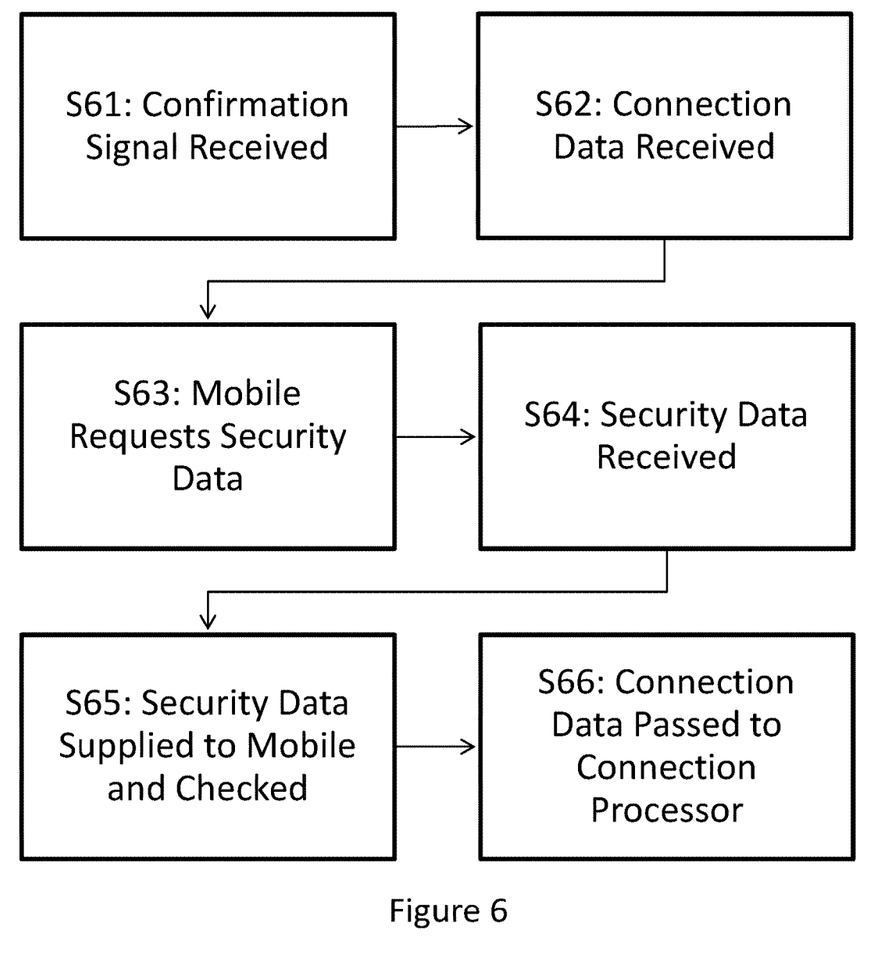
FIG. 6 is shows a flow diagram of a process of connection including device security.

FIG. 6 shows the process followed where Device Security is used. At Step S61, as previously described, a Confirmation Signal is received and the connection process begins. At Step S62, as previously described, the docking controller [14] receives connection data from the Mobile [11]. However, before allowing connection to begin, the Mobile [11] requests Device Security data. This may be requested and provided in a number of forms, including:

The Mobile and the wireless docking station have previously been Associated, and the wireless docking station controller is already aware of the appropriate data for Device Security. As a result, the Mobile only has to send a signal requesting that the wireless docking station controller verify the user and the wireless docking station controller is able to respond with whether or not this verification was successful;

The Mobile transmits an encrypted request to the wireless docking station controller also containing the security data required and the wireless docking station controller responds with whether or not verification was successful;

The Mobile transmits a request for security input, which may or may not be encrypted, and the wireless docking station controller transmits the input received from the user in an encrypted form for the Mobile to verify locally;

The wireless docking station grants the Mobile limited access to some input peripheral devices, so that the user's input is transmitted directly to the Mobile over the connection without any interaction with the wireless docking station controller but the Mobile is not able to access any other peripheral devices and vice versa.

The Device Security data requested and received may be any appropriate type of data and the Mobile [11] may either specifically request a particular type of input, or allow a selection of types of input. These requests and settings may be stored by the wireless docking station controller [14] if appropriate to allow it to automatically request appropriate Device Security data upon encountering a familiar Mobile [11]. It is envisaged that all raw security data will be transmitted in encrypted form, but this is not required. However, if the connection were unencrypted then this would significantly reduce security.

The wireless docking station controller [14] may, when attempting to connect or when the Mobile [12] requests Device Security data, signal the Mobile [12] to indicate what input peripheral devices [13A, 13B, 13D, 13E] it has available. This means that if the Mobile [12] is able to accept Device Security data from any one of a selection of sources, it may indicate to the wireless docking station controller [14] which input peripheral device [13A, 13B, 13D, 13E] should preferably be used. This will reduce the chances of a failed connection and improve the user experience, especially if the wireless docking station controller [14] is able to notify the user in some way of which input peripheral device [13A, 13B, 13D, 13E] should be used. It may do this in a similar way to the methods previously described, such that the Mobile's request for Device Security data triggers a visible, tactile, or audible message to the user. For example, the docking station [1] may control the display device [13C] to display a message "Please enter a password to connect to Jane's Tablet", where 'Jane's Tablet' is the user-friendly name of the Mobile [12].

The docking station [11] will then obtain the required Device Security data at Step S64. If the Mobile [12] has been seen before or the user has already input data, either as part of this interaction—for example, if the Dock Security data and the Device Security data are the same—or as part of an earlier Association interaction after which the Device Security data was stored, it could be possible for stored pre-entered data to be used. Otherwise, the docking station [11] may request that the user input security data as previously described using methods and peripherals such as those described for Dock Security.

In any case, at Step S65, the wireless docking station controller [14] transmits the retrieved or input data to the Mobile [11], which is able to compare it to expected values. If it matches, the Mobile [11] will allow the connection to continue and the process will continue to Step S66, which is the same as Step S46 as described in FIG. 4.

If it does not match, this may lead to automatic failure which will cause the process to end, or the Mobile [11] may allow further attempts, as previously described with regard to Dock Security.

Any one or more of these procedures may be combined in any combination, such that Confirmation may comprise entering one or both types of security data, all three methods may occur in sequence, Dock Security and Device Security may be a single step requiring a single input, or any other appropriate combination.

Figure 7:
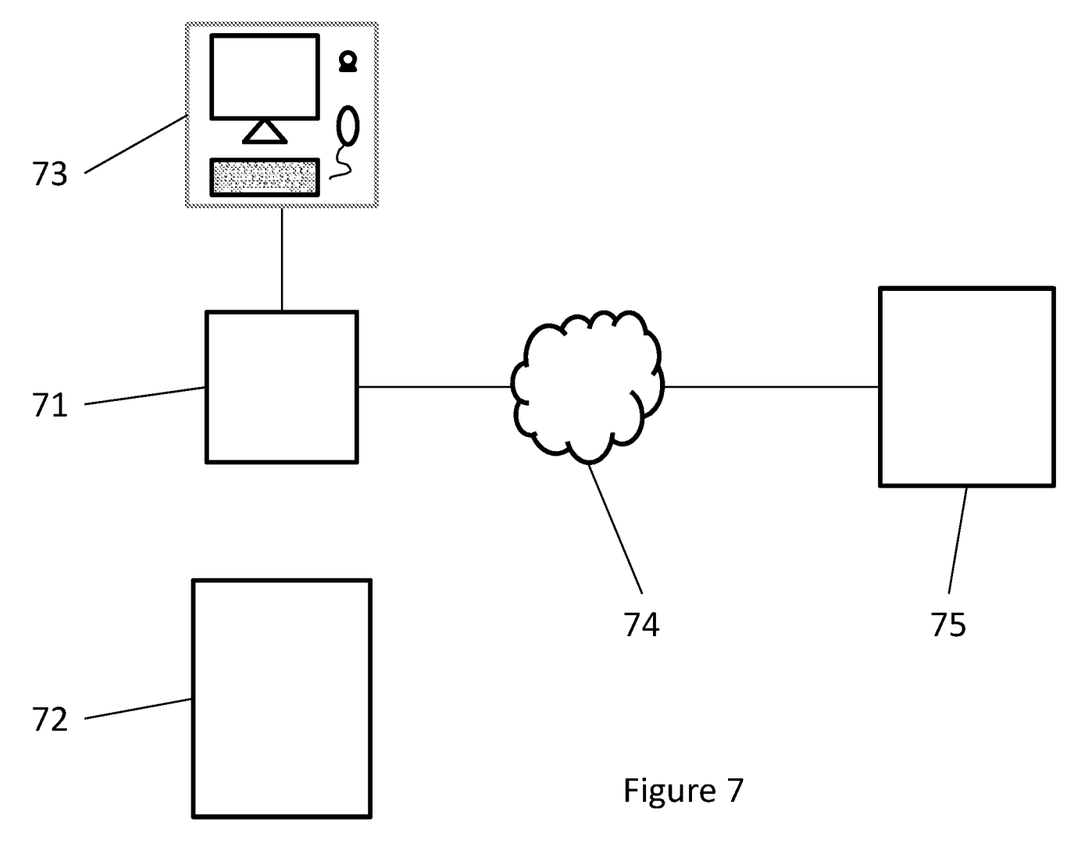
FIG. 7 is a diagram showing a network and security database connected to a docking station.

FIG. 7 shows a system in which a docking station [71] is connected to a collection of peripheral devices [73] and also a network [74]. The network [74] would include many devices, including peripheral devices such as printers, but also servers, including a security server [75]. In this embodiment, this is used for Dock Security and may centrally hold the security inputs required for all docking stations on the network [74]. This will facilitate flexible arrangements such as hot-desking, as it will mean that all docking stations on the network [74] can be arranged to allow a particular connection without requiring changes to the settings of each and every docking station and without requiring a user to memorise multiple passwords, for example.

The process followed would be the same as that shown in FIG. 5 except that instead of the Dock Security input being checked against data stored locally, the data will be fetched from the security server [75] and then checked. Alternatively, the input data may be sent across the network [74] to be checked by the security server [75]; this may be more secure as the required data will then not leave the security server [75].

In an alternative embodiment the security server [75] may also or instead hold Device Security data for previously-connected Mobiles, such that this is fetched when a Mobile [72] requests Device Security data instead of the user having to enter such data afresh, as previously mentioned in FIG. 6 above.

Figure 8:
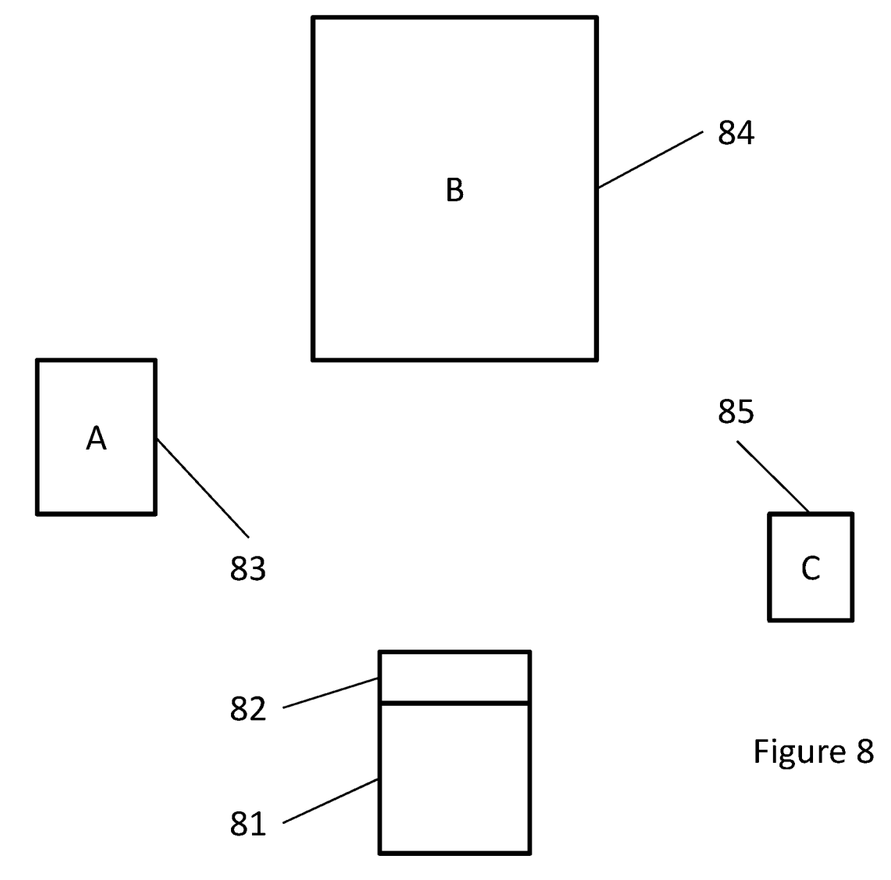
FIG. 8 shows a system of a docking station and several Mobiles.

FIG. 8 shows a collection of Mobiles [83, 84, 85] identified by a wireless docking station controller [82], sized to indicate different levels of signal strength and positioned to indicate location relative to a wireless docking station [81] in order to illustrate heuristics for choosing the order in which the docking controller [82] attempts to connect. The wireless docking station controller [82], as previously described, may be part of a wireless docking station [81] which may be connected to one or more peripheral devices, though these are not shown.

According to a first heuristic, the wireless docking station controller [82] detects the three Mobiles [83, 84, 85] and, for each one, measures its signal strength. It then attempts to connect to the Mobile with the strongest signal—in this case Mobile B [84]—regardless of its location or any other consideration. Only if this attempt fails will it attempt to connect to one of the others [83, 85], in order of signal strength, meaning next in sequence will be Mobile A [83] and finally Mobile C [85].

According to a second heuristic, the wireless docking station controller [82] detects the three Mobiles [83, 84, 85] and queries for their physical locations, either in absolute terms or relative to the wireless docking station [81]. Alternatively, the Mobiles [83, 84, 85] may broadcast their locations and the wireless docking station controller [82] then reads the locations from the beacons sent out by the Mobiles [83, 84, 85] as part of the connection attempt. In any case, the wireless docking station controller [82] is aware of the locations of the Mobiles [83, 84, 85] and thus their distances from the docking station [81]. It then attempts to connect to the closest Mobile—in this case Mobile C [85]—regardless of signal strength. Only if this attempt fails will it attempt to connect to one of the others [83, 84], moving to Mobiles further away from itself until it either succeeds in connecting to a Mobile or no more Mobiles are available.

Figure 9:
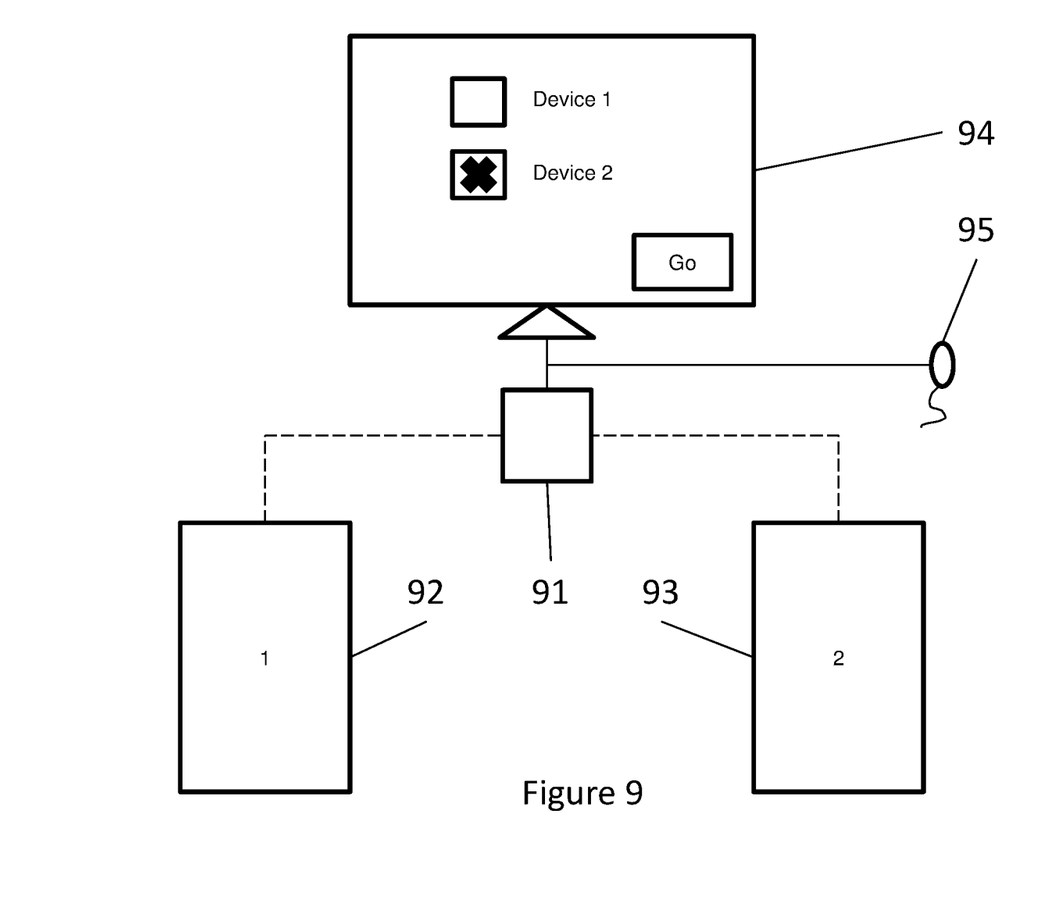
FIG. 9 shows a possible user interface for choosing between possible Mobiles.

FIG. 9 shows a wireless docking station [91] which includes a wireless docking station controller, although in this case the wireless docking station controller is an integral part of the docking station [91] rather than a separate unit as described above with reference to FIGS. 1, 2, 3, and 8. This may be achieved by programming the wireless docking station controller functions into the firmware used by the wireless docking station [91] and providing any additional hardware that may be required as part of the wireless docking station [91].

The wireless docking station [91] is connected to a display device [94] and a mouse [95], and there are also two Mobiles [92, 93] which have been detected and identified by the wireless docking station [91], shown connected to it by dashed lines as these are not complete connections.

FIG. 9 shows an example of a further method of choosing one of a number of Mobiles [92, 93] to which the wireless docking station [91] could connect. The firmware of the wireless docking station [91] includes a capacity for displaying a simple user interface on the display device [94]. An example of such a user interface is shown in FIG. 9 and allows the user to view the Mobiles [92, 93] to which the wireless docking station [91] could connect and select the preferred Mobile, in this case 'Device 2' [93]. Once the selection is made and confirmed, the wireless docking station [91] and/or Mobile [93] may request security data as previously described. There may be a further Confirmation step required either before or after this selection is made, but in most embodiments it is likely that the act of selecting a Mobile to which the wireless docking station [91] should connect will be sufficient to indicate intention to connect.

This is an example of the Connection Trigger and the Confirmation Signal being separate, as the Connection Trigger causes the wireless docking station [91] to search for possible Mobiles [92, 93] but the act of selecting one causes a Confirmation Signal. After this point, Dock Security or lack of it would be the same regardless of the Mobile selected while Device Security would obviously change depending on the Mobile.

In all cases where multiple Mobiles are detected, if one connection fails, for example due to the entry of incorrect Device Security data, the docking controller may automatically attempt to connect to the next-most-preferred Mobile or, if appropriate, re-display a user interface.

Although only a few particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa.

The invention claimed is:

1. A method of controlling a wireless docking station, the wireless docking station having one or more peripheral devices connected thereto, the one or more peripheral devices being controllable from a mobile device when the mobile device is docked with the wireless docking station, the method comprising:
   receiving a sensing signal indicating that a user is proximate the one or more peripheral devices;
   in response to receiving the sensing signal indicating that a user is proximate the one or more peripheral devices, searching for a mobile device within a predetermined range of the wireless docking station;
   detecting a mobile device within a predetermined range of the wireless docking station;
   determining an identification of the detected mobile device;
   requesting confirmation from the user that the user wants to dock the detected mobile device having the determined identification with the wireless docking station;
   receiving a confirmation signal in response to the requested confirmation indicating that the user wants to dock the mobile device having the identification with the wireless docking station; and
   in response to receiving the confirmation signal, permitting an authentication of the mobile device having the identification to be performed whereby the mobile device having the identification is docked with the wireless docking station if the authentication is successful.

2. The method of claim 1, further comprising, in response to receiving the confirmation signal, obtaining an authorisation signal indicating that the user is authorised to dock the mobile device having the identification with the wireless docking station.

3. The method of claim 2, wherein the authorisation signal indicates that the user is authorised to use the wireless docking station.

4. The method of claim 2, wherein the authorisation signal indicates that the user is authorised to use the mobile device having the identification.

5. The method of claim 2, wherein obtaining the authorisation signal comprises sending an authorisation request signal to a particular peripheral device to notify the user that the authorisation signal is being requested.

6. The method of claim 5, further comprising utilising the predetermined peripheral device to notify the user that an answer to a predetermined question is required in order to provide the authorisation signal.

7. The method of claim 6, wherein the answer is sent to the mobile device having the identification to allow the mobile device having the identification to determine whether the answer is correct and to provide the authorisation signal if the answer is correct.

8. The method of claim 2, wherein the authorisation signal is produced following the user input via at least one of:
   a mouse used to enter a sequence of data inputs,
   a keyboard used to enter a sequence of key actuations;
   a touch sensitive display panel used to enter a sequence of data inputs;
   a desktop phone used to enter a sequence of key pushes; or
   a biometric scanner used to enter one or more of a retinal scan, a facial recognition signal, a fingerprint scan, a handprint scan, or a voice recognition signal.

9. The method of claim 1, wherein the sensing signal is received from at least one of:
   a proximity sensor indicating that the user is within a predetermined distance;
   a seat sensor indicating the user has sat down on a seat proximate the one or more peripheral devices;
   a camera indicating the presence of the user;
   a mouse indicating a movement of the mouse or a press of a mouse button of the mouse;
   a touch sensitive display panel indicating a press of a button on the touch sensitive display panel;
   a desktop phone indicating a press of a button on the desktop phone or indicating the presence of a user by a camera on the desktop phone; or
   a keyboard indicating a press of a key on the keyboard.

10. The method of claim 1, wherein requesting confirmation from the user comprises:
    sending a confirmation request signal to a particular peripheral device, the confirmation request signal including the identification of the mobile device; and
    utilising the particular peripheral device to notify the user that a confirmation indicating that the user wants to dock the mobile device having the identification is required.

11. The method of claim 10, wherein the confirmation request signal includes a plurality of the identifications of a plurality of the mobile devices detected within the predetermined range of the wireless docking station, and the particular peripheral device is used to request the user to confirm which of the plurality of mobile devices the user wants to dock with the wireless docking station.

12. The method of claim 10, wherein the particular peripheral device comprises at least one of:
    a display screen;
    a touchscreen display panel;
    a desktop phone having at least a speaker and, optionally, a display; or
    a speaker.

13. The method of claim 1, wherein the confirmation signal is produced by a user actuating at least one of:
    a mouse;
    a push button on a housing of the wireless docking station;
    a particular button on a keyboard;
    a particular button on a touch sensitive display panel;
    a particular button on a desktop phone; or
    a microphone.

14. The method of claim 1, wherein the one or more peripheral devices comprises at least one of:
- a mouse;
- a keyboard;
- a display screen;
- a touchscreen display panel;
- a camera;
- a speaker;
- a microphone;
- a biometric scanner; or
- a desktop telephone.

15. A wireless docking station controller for controlling a wireless docking station, the wireless docking station having one or more peripheral devices connected thereto, the one or more peripheral devices being controllable from a mobile device when the mobile device is docked with the wireless docking station, the wireless docking station controller configured to:
- receive a sensing signal indicating that a user is proximate the one or more peripheral devices;
- in response to receiving the sensing signal indicating that a user is proximate the one or more peripheral devices, search for a mobile device within a predetermined range of the wireless docking station;
- detect a mobile device within a predetermined range of the wireless docking station;
- determine an identification of the detected mobile device;
- request confirmation from the user that the user wants to dock the detected mobile device having the determined identification with the wireless docking station;
- receive a confirmation signal in response to the requested confirmation indicating that the user wants to dock the mobile device having the identification with the wireless docking station; and
- in response to receiving the confirmation signal, permit an authentication of the mobile device having the identification to be performed whereby the mobile device having the identification is docked with the wireless docking station if the authentication is successful.

16. A system comprising the wireless docking station controller of claim 15, a wireless docking station connected to the wireless docking station controller and one or more peripheral devices connected to the wireless docking station, the one or more peripheral devices comprising at least one of:
- a mouse;
- a keyboard;
- a display screen;
- a touchscreen display panel;
- a camera;
- a speaker;
- a microphone;
- a biometric scanner; or
- a desktop telephone.

17. The system of claim 16, configured to:
- utilise the predetermined peripheral device to notify the user that an answer to a predetermined question is required in order to provide the authorisation signal.

18. The system of claim 16, wherein the answer is sent to the mobile device having the identification to allow the mobile device having the identification to determine whether the answer is correct and to provide the authorisation signal if the answer is correct.

19. The wireless docking station controller of claim 15, wherein the wireless docking station controller is further configured to, in response to receiving the confirmation signal, obtain an authorisation signal indicating that the user is authorised to dock the mobile device having the identification with the wireless docking station.

20. The wireless docking station controller of claim 19, wherein the wireless docking station controller configured to send an authorisation request signal to a particular peripheral device to notify the user that the authorisation signal is being requested.

* * * * *